United States Patent
Murray et al.

(10) Patent No.: US 8,118,649 B1
(45) Date of Patent: Feb. 21, 2012

(54) GRAIN DISTRIBUTION SENSOR AND CONTROL

(75) Inventors: Craig Elwyn Murray, Davenport, IA (US); Dale R. Tanis, Geneseo, IL (US); James W. Minnihan, Moline, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/873,523

(22) Filed: Sep. 1, 2010

(51) Int. Cl.
*A01D 75/18* (2006.01)
*A01F 12/16* (2006.01)
*A01F 21/00* (2006.01)

(52) U.S. Cl. ............................................... 460/5; 460/4
(58) Field of Classification Search .............. 56/10.2 R; 460/5, 114, 4, 7, 2; 209/599, 261, 318, 287; 73/579
See application file for complete search history.

(56) References Cited

U.S. PATENT DOCUMENTS

| | | | |
|---|---|---|---|
| 3,552,396 A | 1/1971 | Gerhardt et al. | |
| 4,259,829 A * | 4/1981 | Strubbe | 460/5 |
| 4,466,231 A * | 8/1984 | Rowland-Hill et al. | 460/2 |
| 4,875,889 A | 10/1989 | Hagerer et al. | |
| 5,312,299 A * | 5/1994 | Behnke et al. | 460/5 |
| 5,489,239 A | 2/1996 | Matousek et al. | |
| 5,775,072 A * | 7/1998 | Herlitzius et al. | 56/10.2 R |
| 6,003,387 A | 12/1999 | Larson et al. | |
| 6,053,811 A | 4/2000 | Johnson et al. | |
| 6,146,268 A * | 11/2000 | Behnke et al. | 460/4 |
| 6,468,154 B1 * | 10/2002 | Eggenhaus et al. | 460/101 |
| 6,632,136 B2 * | 10/2003 | Anderson et al. | 460/101 |
| 7,226,355 B2 | 6/2007 | Schenk | |
| 7,393,275 B2 | 7/2008 | Voss et al. | |
| 7,572,180 B2 * | 8/2009 | Ricketts et al. | 460/101 |
| 7,584,663 B2 | 9/2009 | Missotten et al. | |
| 7,670,218 B2 | 3/2010 | Behnke et al. | |
| 7,771,260 B2 * | 8/2010 | Ricketts et al. | 460/9 |
| 2005/0150202 A1 | 7/2005 | Quick | |
| 2009/0036184 A1 | 2/2009 | Craessaerts et al. | |

* cited by examiner

*Primary Examiner* — Arpad Fabian-Kovacs
(74) *Attorney, Agent, or Firm* — Michael G. Harms

(57) ABSTRACT

A system for use with the combine comprises a plurality of sensors to detect the uniformity of crop material being conveyed running threshing portion of the combine to including system into combine. Methods and systems are provided that utilize this plurality of sensors to provide substantially automatic control of combine parameters that mitigate the non-uniformity of a grain bed in the cleaning system. The system may also inform an operator of a suggested manual adjustments to mitigate the non-uniformity.

23 Claims, 12 Drawing Sheets

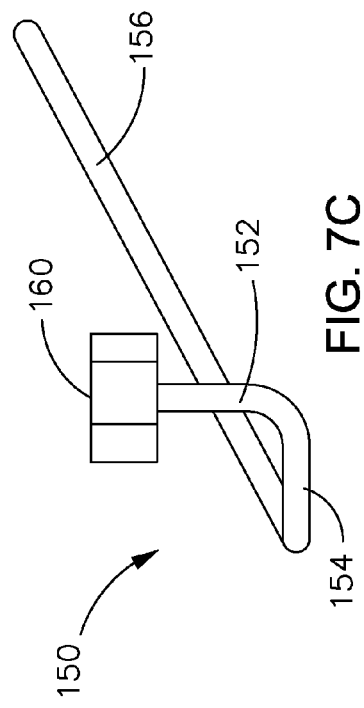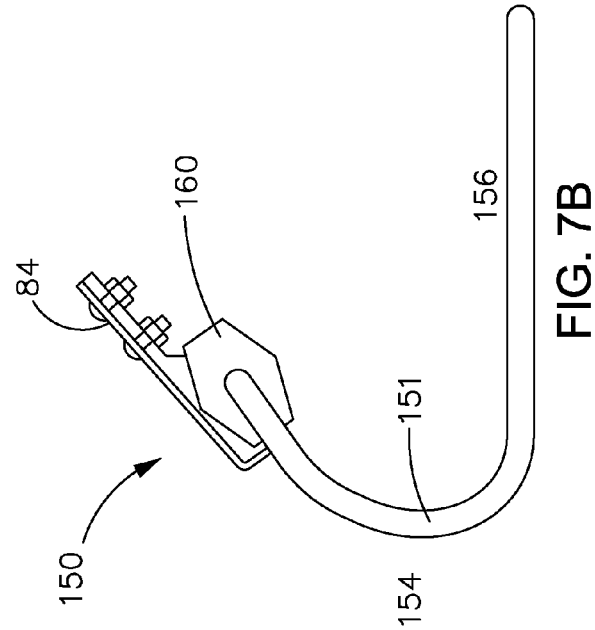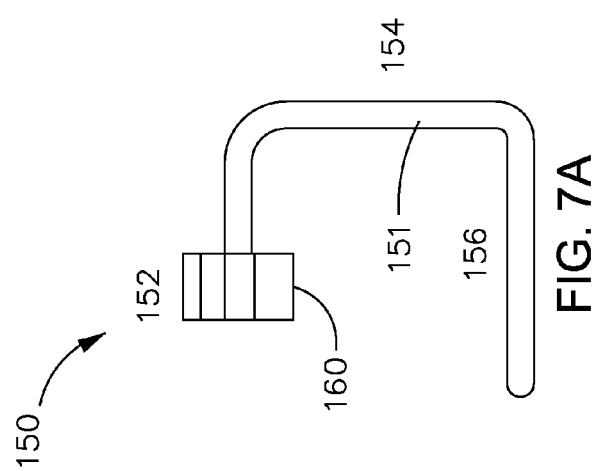

GRAIN DISTRIBUTION SENSOR AND CONTROL

TECHNOLOGY FIELD

The present invention relates generally to agricultural harvesters, and more particularly, to sensors and systems for maintaining approximate uniformity of crop material in a harvester cleaning system.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, and flax or linseed. The waste (e.g., straw) left behind on the field includes the remaining stems and leaves of the crop having limited nutrients which may be, for example, chopped and spread on the field or baled for feed and bedding for livestock.

The cut crop may be picked up and fed into the threshing and separating mechanism of the combine, typically consisting of a rotating threshing drum to which grooved steel bars may be bolted. These bars thresh or separate the grains and chaff from the straw (sometimes referred to as residue) through the action of the drum against the concaves, i.e., shaped "half drum," that may also be fitted with angled steel bars (e.g. rub bars) and a meshed grill, through which grain, chaff and smaller debris may fall, whereas the straw, being too big or long, is carried through to the outlet. Typically, the drum speed may be variably adjustable and the distance between the drum and concave may be finely adjustable laterally and together, to achieve optimum separation and output.

In an axial flow combine, this threshing and separating system serves a primary separation function. The harvested crop is threshed and separated as it is conveyed between a longitudinally arranged rotor and the inner surface of an associated chamber comprising threshing and separating concaves. The cut crop material spirals and is conveyed along a helical path along the inner surface of the chamber until substantially only larger residue remains. When the residue reaches the end threshing drum, it is expulsed out of the rear of the combine. Meanwhile, the grain, chaff, and other small debris falls through the grates in concaves onto a conveyor system. For ease of reference, this smaller particulate crop material that contains the grain and chaff is referred to as threshed crop. The threshed crop still needs to be further separated from the chaff by way of a winnowing process.

Clean grain is separated out of the threshed crop by way of a flat cleaning system that can include a chaffer and sieves. Generally, the cleaning system operates by blowing air through the threshed crop to winnow the chaff and then sieving the grain to separate the grain from other particulates. The chaffing and sieving system on most modern combines operates on the assumption that the conveyor system delivers a fairly uniform grain bed. For example, the chaffing process optimally works on an assumed range of thicknesses of separated crop in a grain bed, which allows fans to blow off the chaff. If the thickness of material in the grain bed is too thick, the airflow supplied will be insufficient. Furthermore, the sieves may be unable to process the grain quickly enough, such that if threshed crop is delivered too quickly to one portion of the sieve area in the grain bed, the system may dog or the yield of the grain in the area may be reduced.

Conventional operation procedures for combine operation recommend that an operator visually and manually inspect the grain bed to determine if the grain bed is uniformly distributed. Currently, this requires the operator to perform a kill stall, whereby the operator stops the combine, gets out of the cab, accesses the grain bed or conveyor system, and checks for uniform or uneven distribution. If the grain bed is uneven, the operator can adjust mechanisms in the separator system manually until the grain bed is substantially uniform. This process is labor intensive and requires a skilled operator. The prior art does not include a system with sensors to alert the operator of the uniformity of the grain bed without requiring manual/visual inspection by the operator, which generally requires the operator stop harvesting. Furthermore, because the prior art does not teach sensors for monitoring uniformity of the grain bed, no automated feedback systems are available to optimize the cleaning system while harvesting.

SUMMARY

Embodiments of the present invention address and overcome one or more of the above shortcomings and drawbacks, by providing methods and systems for automation and feedback regarding grain distribution to allow an operator to more quickly or automatically adjust combine configurations to optimize grain distribution within the cleaning system.

Embodiments of the present invention are directed to a combine comprising a cleaning system having a grain bed. The combine further includes a conveyor system that moves crop material to the grain bed for cleaning. A plurality of sensors is placed between the conveyor system and the grain bed for monitoring a lateral uniformity of a distribution material entering the grain bed. A control system receives electrical signals from the plurality of sensors and monitors the electrical signals to monitor the lateral uniformity.

Embodiments of the present invention are directed to system for controlling distribution of material in a cleaning system that includes a conveyor system that moves crop material to the cleaning system. The system also includes a plurality of sensors placed approximately at the boundary of conveyor system and the cleaning system that can be used to monitor a lateral uniformity of the distribution of material entering the cleaning system. The system further includes a control system that receives electrical signals from the plurality of sensors and monitor the lateral uniformity and adjusts at least a subset of electrically adjustable elements, the adjustment of which that can alter the distribution of material, to substantially maintain the lateral uniformity.

According to one aspect of the invention, an operator interface displays information about a non-uniformity in the amount material entering the grain bed. In some embodiments, the control system displays, via operator interface, recommended adjustments to correct the non-uniformity. The recommended adjustments can include adjusting a concave position or adjusting an orientation of vanes in a threshing mechanism. In some embodiments, the recommended adjustments require a manual adjustment by the operator.

According to another embodiment of the invention the plurality of sensors includes a plurality of feeler rod sensors for detecting a local volume of material. In some embodiments, the plurality of sensors includes a plurality of load sensors for detecting a local mass of material. In some embodiments, the plurality of sensors includes a plurality of quantized load sensors for detecting a number of particles flowing in a local area.

In another aspect of the invention, the control system adjusts the subset of electrically adjustable elements in substantially real time or before a non-uniformity occurs.

Embodiments of the present invention are directed to a for controlling distribution of crop material in a cleaning system within a combine. The method causes crop material to move into a cleaning system to clean grain in the crop material. The method further receives a plurality of electrical signals from a plurality of sensors that determine a quantity of crop material entering the cleaning system. The method further determines from the electrical signals the approximate uniformity in a lateral distribution of crop material entering the cleaning system. The method further determines at a processor if the approximate uniformity should be corrected by adjusting one or more configuration of the combine. The method further adjusts at the one or more configuration of the combine to substantially maintain a substantially uniform lateral distribution of crop material.

According to one aspect of the invention, adjustments include electrically adjusting one or more electrically adjustable elements, which can be in substantially real time.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 7A, 7B, and 7C are a front facing, right facing, and top views, respectively of an exemplary feeler rod sensor for use with the present invention;

DETAILED DESCRIPTION OF ILLUSTRATIVE EMBODIMENTS

The above problems in the prior art have motivated the creation of methods and systems to monitor the flow of threshed crop material into and through a cleaning system in a combine. By using a plurality of sensors, the system can determine the approximate lateral uniformity of the material. Using electrically controlled actuators or motors, or other electro-mechanical elements, some embodiments of the present invention can automatically adjust the configuration of the combine to substantially reduce or prevent lateral non-uniformity of the grain bed in the cleaning system. Furthermore, if manual adjustment of the combine configuration is needed, some embodiments can automatically alert the operator of the combine of the need to make a manual adjustment to correct a non-uniformity, and further detail the steps needed to correct the non-uniformity. Some embodiments utilize sensors to monitor a quantity of volume, mass, and/or flow rate of material entering the grain bed in the cleaning system.

Figure 1:
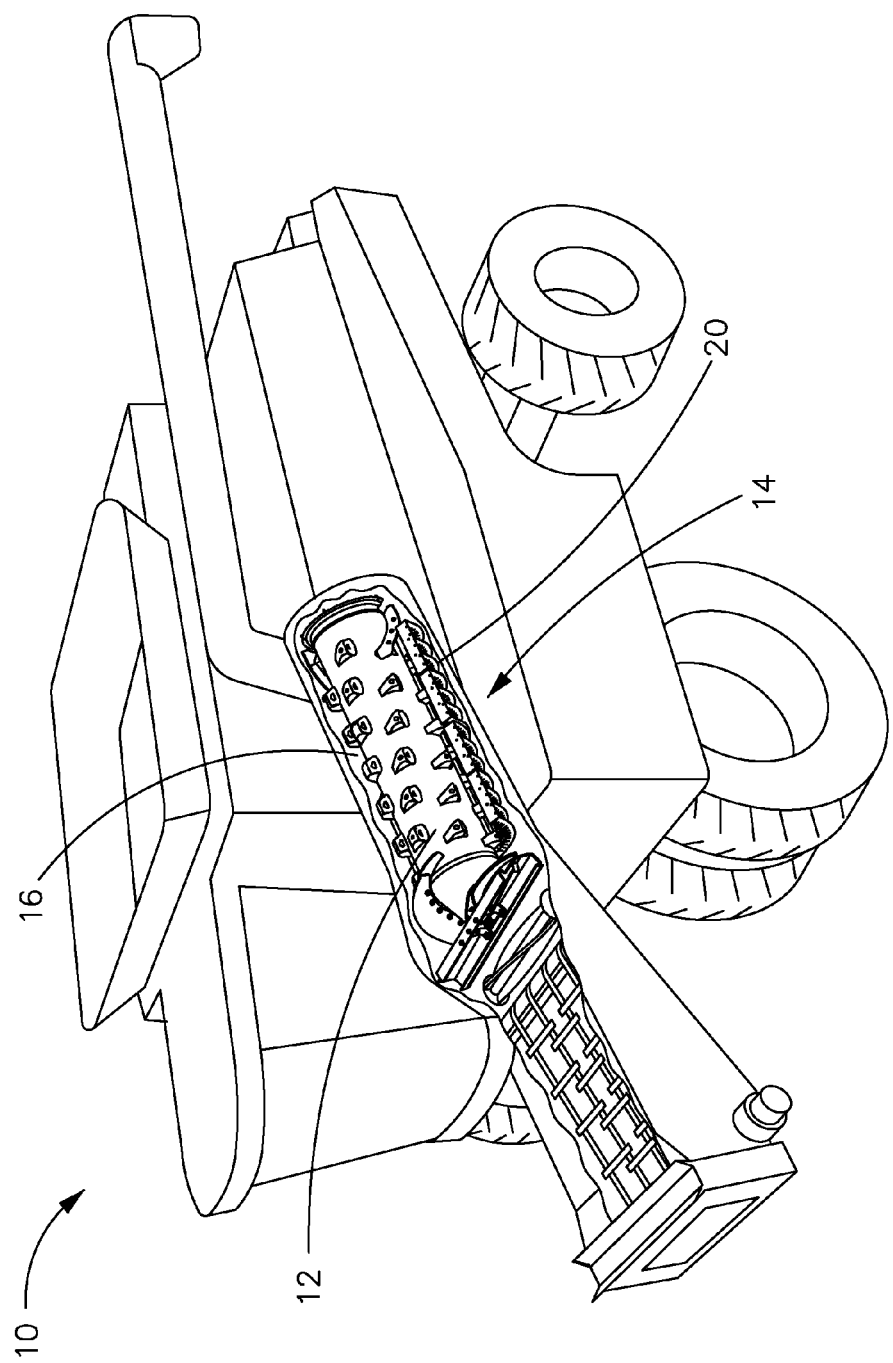
FIG. 1 is a perspective view of a harvester for use with the present invention.

FIG. 1 shows an exemplary agricultural combine 10. As shown in FIG. 1, the combine 10 includes a longitudinally axially arranged threshing and separation system 14 of well known construction and operation. The helical bar concave 20 may also be used with combines having transversely aligned threshing and separation system in a combine.

As shown, threshing and separation system 14 is axially arranged, in that it includes a cylindrical threshing rotor 12 conventionally supported and rotatable in a predetermined direction about a rotational axis therethrough for conveying a flow of crop material in a helical flow path through a threshing chamber 16 extend circumferentially around the rotor 12. As shown, concaves 20 may extend circumferentially around the rotor 12 and the flow of crop may pass in the space between the spinning rotor and the concaves. As the crop material flows through the threshing and separation system 14, the crop material including, for example, grain, straw, legumes, and the like, will be loosened and separated from crop residue or waste such as, for example, husks, cobs, pods, and the like, and the separated materials may be carried away from the threshing and separation system 14 in a well known conventional manner. As threshed crop falls through the grates in concaves 20, it is moved by a conveyor system to a grain bed in a cleaning system, which are described in detail below.

Figure 2:
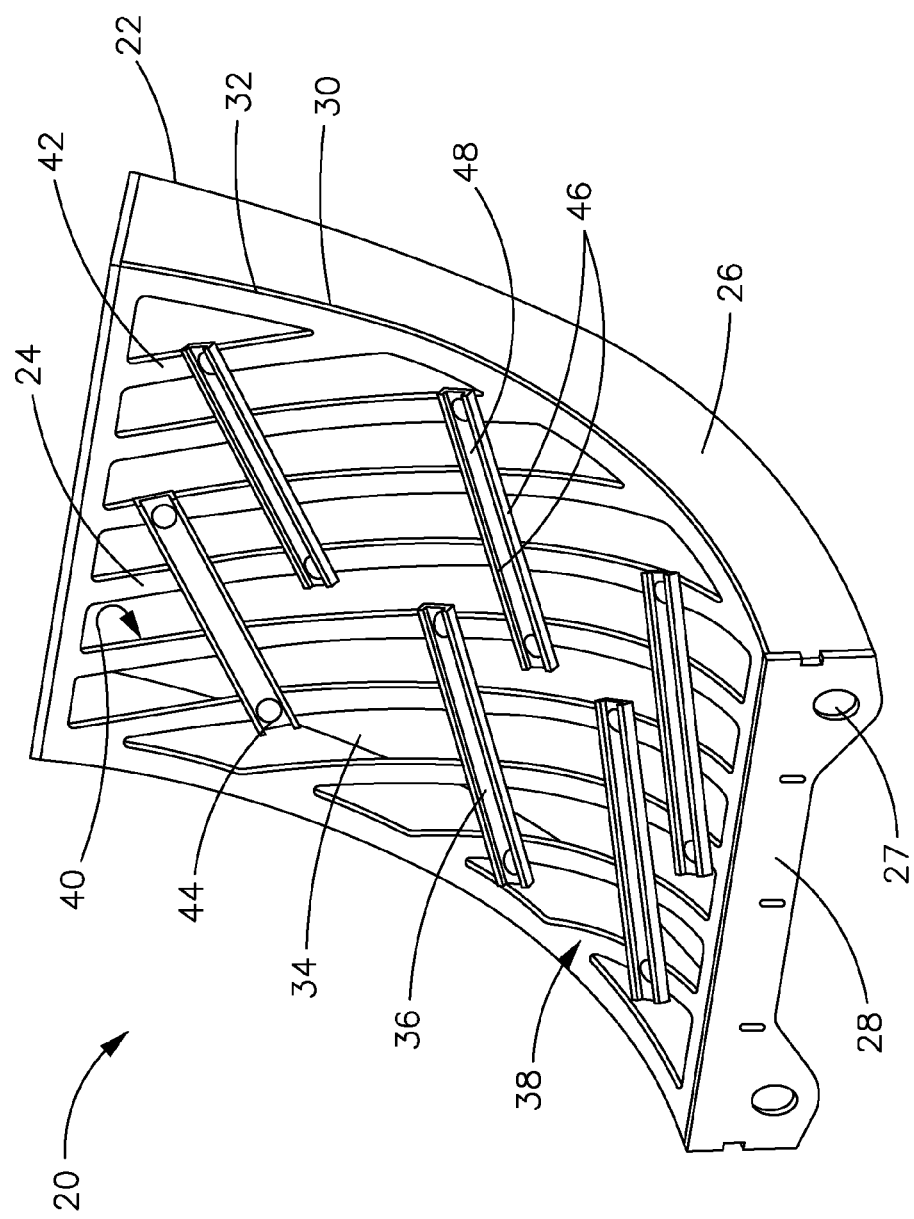
FIG. 2 is a perspective view of an exemplary concave for use with the present invention.

FIG. 2 shows of an exemplary concave 20 for use with certain embodiments of the present invention. In some embodiments, as shown in FIG. 2, the concaves can include rub bars or vanes (e.g. transport vanes) that define a helical pattern. In other embodiments, the rub bars may be oriented in any manner chosen by a person skilled in the art or by an operator. For example, the rub bars or vanes may be oriented substantially horizontal, perpendicular to the flow of crop material, or may be adjustable via bolts or electrical actuators. In the example shown in FIG. 2, the concave includes a frame 22 mounted to a grate 24. As shown, the frame 22 includes side walls 26 and end walls 28 extending between and connected to the two side walls 26. The side walls 26 include a curved top edge 30 having a predetermined radius. The side walls 26 and end walls 28 define a top opening 32.

As shown in FIG. 2, the grate 24 includes a plurality of cutouts (openings) 34 and a plurality of rub bars 36. The grate 24 is connected (e.g., welded) over the top opening 32 in the frame 22. The grate 24 includes an inside radius corresponding to the radius of the curved top edge 30 of the side walls 24. The radius is measured from the longitudinal axis of rotation of the rotor and substantially corresponds to the curvature of an outer circumference of the rotor 12. The grate 24 includes an interior surface 38 (also referred to inside surface or top surface) and an exterior surface 40 (also referred to outside surface or bottom surface). The interior surface 38 comprising a concave functional surface for contacting a crop.

In the exemplary concave shown in FIG. 2, The grate includes corresponding mounting framework or mounting frames 42 in the concave's functional surface separating the cutouts 34. As shown, the grate 24 also includes holes 44 in the mounting framework 42 for mounting the rub bars 36 to the grate 24. In some embodiments, these rub bars or vanes can be mounted such that they are manually adjustable or adjustable via an electrically controlled mechanism to allow the pitch angle of the rub bars or vanes to be adjustable remotely or in response to an electrical input.

It should be noted that embodiments of the present invention are not limited to the configuration of the concaves shown in FIG. 2, and some embodiments of the present invention can be used with any conventional concave separator system available to a person having skill in the art.

Figure 3A:
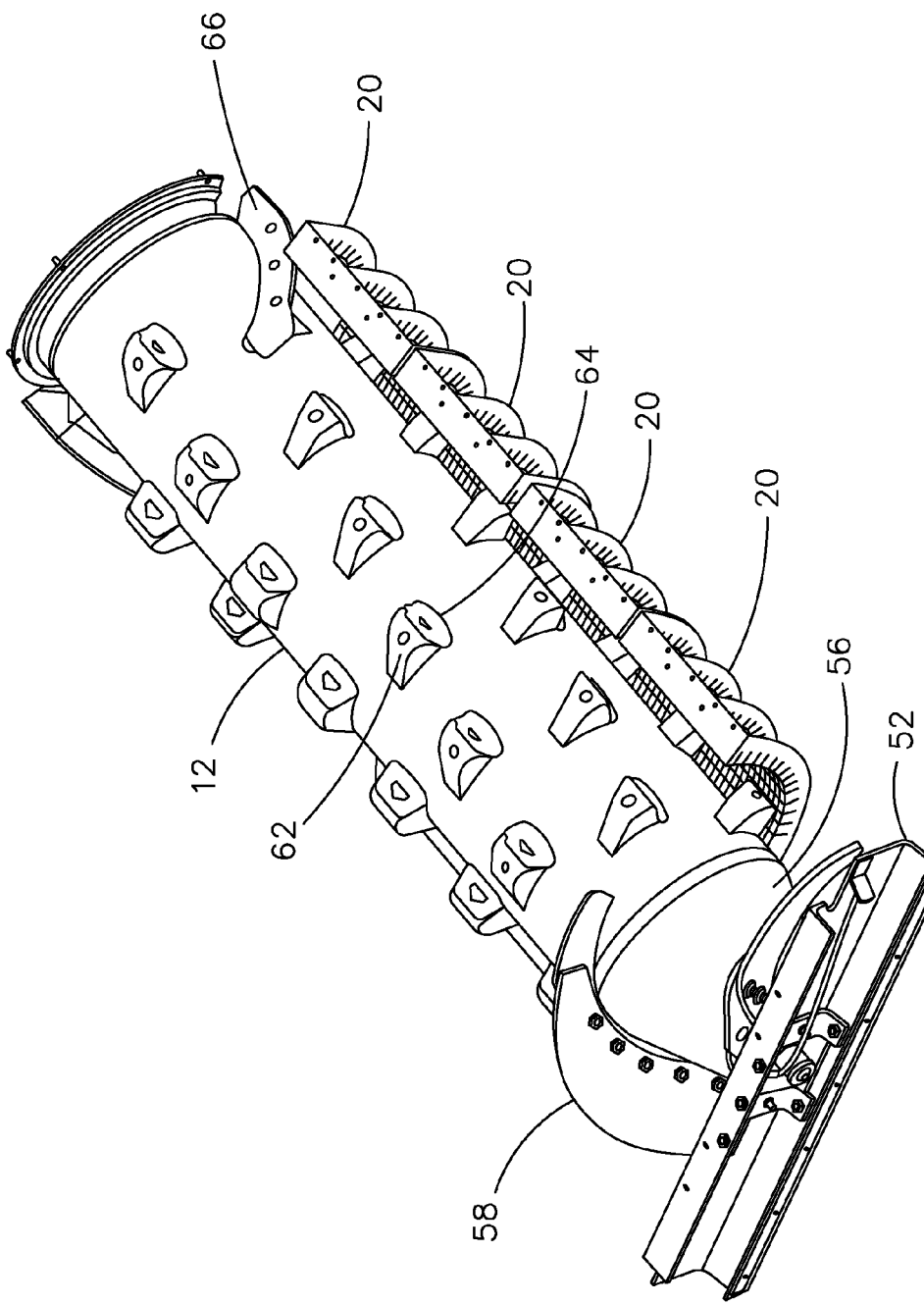
FIG. 3A is a perspective view of an exemplary threshing system for use with the present invention.
Figure 3B:
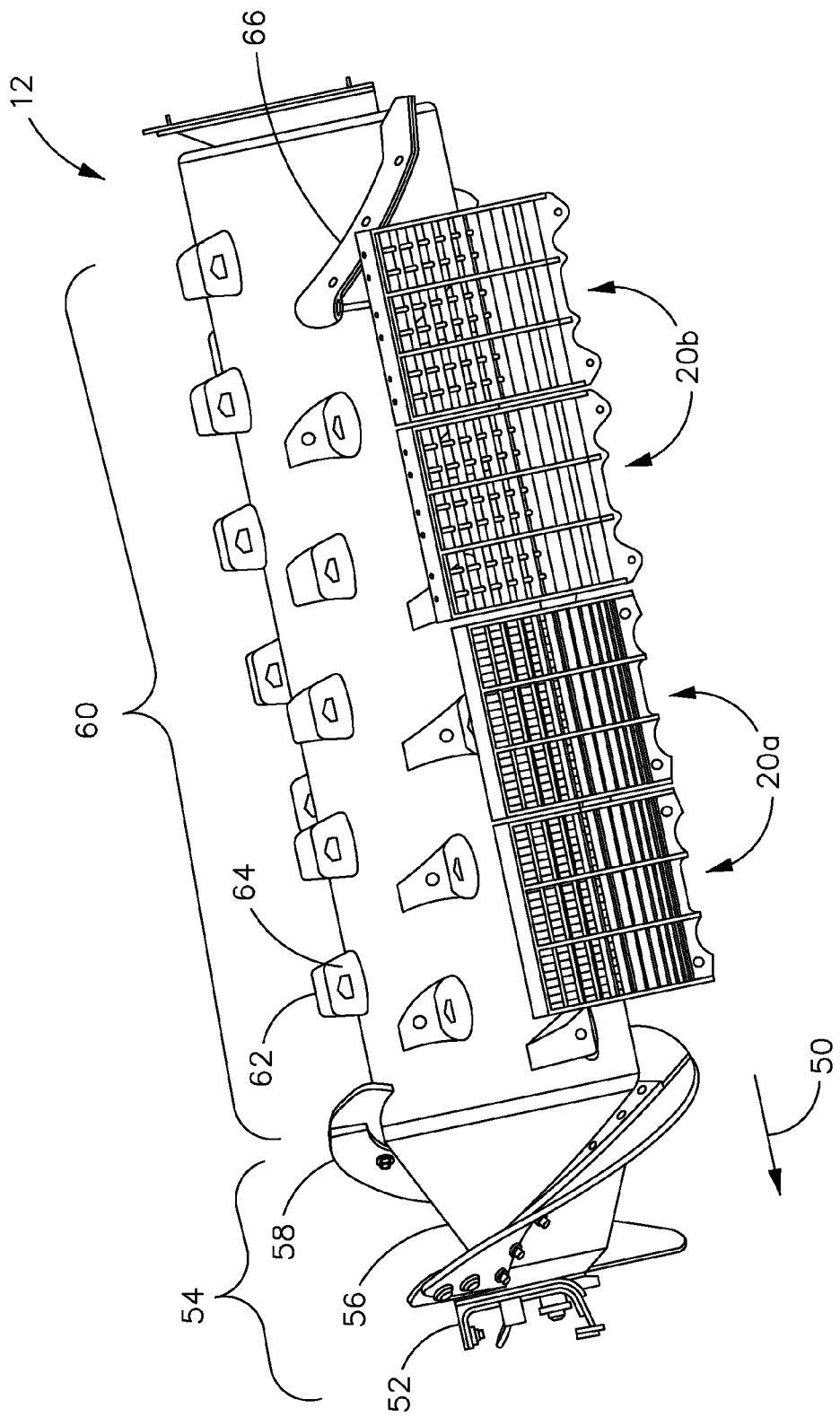
FIG. 3B is a left side view of a threshing system for use with the present invention.

FIGS. 3A and 3B show an exemplary rotor 12 and concave 20 arrangement for use with some embodiments of the present invention. It will be appreciated that the threshing mechanism can include more than one of threshing rotor. As shown, the concaves 20 may be mounting in close proximity to the rotor 12 with a space or clearance therebetween for a crop to flow. In a typical combine 10, an individual concave 20 may wrap approximately 150 to 160 degrees around the rotor 12. The concave 20 may comprise one piece or may be split into multiple parts. For example, the concave may be split into two halves that may be connected together end-to-end to form a full concave. End walls 26 may include one or more openings or holes 27 for receiving a fastener (e.g., a bolt) for connecting the two halves of the concave together (see e.g., FIG. 2). This feature may be advantageous, for example, on larger combines to facilitate handling, installation and removal.

Further, H-frames may be provided for mounting of the concave or concaves. In the embodiment illustrated in FIGS. 3A and 3B, two H-frame boxes may be provided having four module positions or mounting locations for receiving individual concaves. A complete combine may include, for example, four left concaves and four right concaves to produce a fully off-setted threshing module.

The concaves may be configurable and interchangeable between positions to allow the combine to work with a variety of threshable crops. The concave modules may be selected and positioned to thresh and separate grain appropriately at a relatively high capacity. For example, the concave in the number 1 position and the number 4 position may be interchangeable and the concaves in the number 2 position and the number 3 position may be interchangeable. Typically, concaves on the right side may be interchangeable with one another (switching position front to back) and concaves on the left side may be interchangeable with one another (switching position front to back). Typically, concaves from the left side may not be exchanged with concaves on the right side due to mounting configurations.

As shown in FIGS. 3A and 3B, the front concaves may have a small mounting frame configuration and the back concaves have a larger mounting frame configuration—i.e., more percent open area. In some embodiments, the forward concaves 20a in the concave area can be adjusted separately from the rear concaves 20b, sometimes referred to as a grate area.

FIGS. 3A and 3B show a top side view and a left side view, respectively, of an exemplary rotor 12. As shown, the rotor 12 rotates clockwise when viewed from a position at the rear of the rotor, looking forward to the direction of travel (arrow 50). That is, the illustrated rotor 12 of FIG. 3B is rotating such that the top of the rotor is going into the page and the bottom of the rotor would be coming out of the page.

As shown, the rotor 12 includes a front rotor support 52 at the front (the left side in the figure). The illustrated support includes a front rotor support 52 having a C-channel curvature that holds up and supports the rotor 12. The in-feed area 54 of the rotor is from that bearing support plate or that rotor support channel to the number one module position which is mainly constructed of the conical grey cone 56 and the helical auger plates 58.

After this transition area 54, the crop goes through an acceleration period in which you have a feed device that is feeding crop from the header. The crop is fed at some factor of acceleration, which may depend, for example, on how fast the rotor is spinning and how fast the feeder is going, etc. But generally, there is always an increase in speed of the crop in this region of the combine. The motion of the rotor 12 also acts to thin the crop and transmits it rearward. The rotor conveys the crop into the thresher section 60 of the rotor, which is the tubular portion. Rasp bars 62 are mounted using conventional techniques (e.g., bolted) to the barnacles or the rasp bar supports 64. The rasp bar supports 64 may be connected using conventional techniques (e.g., welded) to the cylindrical portion of the rotor 12. In some embodiments, rasp bars 62 may be electrically adjustable such as controlled by electrically controlled hydraulic actuators.

As shown, a helical kicker 66 may be provided at the rear of the rotor (right side in the figure) to expel the crop out of the threshing chamber. Typically, this expelled material goes either onto the ground or into a collection device, such as a straw chopper or a discharge beater, in which a subsequent action may be taken on the straw. As the crop flows through the threshing chamber, it flows in a cylindrical or spiral pattern as a result of the rotating rotor. When it gets to the rear of the rotor, that rotor ends and so does the crop flow path. The helical kicker 66 helps ensure full discharge of the crop from the threshing chamber.

In the illustrated rotor arrangement, concaves 20 are adjustable to set the threshing clearance (the distance between the rotor (and rotor rasp bars) and the concave (and concave rub bars). For example, if threshing wheat, an operator might tighten up the clearance due to the small kernel size. For corn, an operator might want a more open area to allow for cobs, and the adjustable feature allows an operator to tailor and adjust for threshing based on the particular crop. This position is where the grinding and threshing action occurs and where most of the grain is threshed.

This customization and adjustability to achieve the desired grind or to rub the crop adequately to thresh the grain may be determined based on a number of factors, such as the crop, plant characteristics, the growing seasons, and the like. For example, sometimes it is desirable to run a very wide clearance for wheat, sometimes it is required to run a very tight clearance for hard to thresh wheat. The exact arrangement of concaves 20 relative to the threshing rotor 12 can be adjusted to achieve the desired clearance. The resulting arrangement can affect the distribution of the falling grain as it falls through the grates in the concaves onto the conveying system.

In some embodiments concaves 20 can be adjusted in two directions. The support structure for the concaves allows the concaves 20 to be laterally adjusted, e.g. moving the concaves in and out of the page in a linear fashion. This allows the concaves, which have a substantially fixed curvature, to be close to the rotating thresher rotor on one side or the other. For example, if the concaves in the grate area 20a are moved laterally to the right (e.g. into the page in FIGS. 3A and 3B), the threshing rotor will be closer to the concave grates 20a on the left side (e.g. the threshing clearance between the rotor and the portion of the grates 20*a* shown in FIG. 3B will be reduced.)

Concaves 20 can also be adjusted substantially vertically relative to the thresher rotor 12. In some embodiments, the mechanism for vertically adjusting the concave grates 20 can include a hinge/pivot and support on one side of the half drum rotor 12. By moving the concave grate relative to this hinge, the grate may be adjusted in an arc, bringing the grate closer or further from the rotating threshing rotor. If this hinge is placed substantially near the height of the center of the threshing rotor, the resulting arc will be a first order approximation of a vertical translation. In some embodiments the support independent point of the concave can be controlled via electrical signals that control actuators that control the translational position of the good point. In some embodiments other actuators can adjust the angular position of the concave relative cuteness to the point. In this manner, actuators can control the lateral position of the concave by moving the pivot point and other actuators can adjust these substantially vertical position of the concave by providing angular adjustment relative to.

As used throughout, actuators that can include electrically controlled motors, linear electro-mechanical actuators, electrically controlled hydraulic or pneumatic actuators, motors, or any other electrically controlled adjustable device suitable for making a desired adjustment as will be available to a person of ordinary skill in the art.

By including a lateral adjustment and a substantially vertical adjustment, it will be appreciated that the relative concentricity of the threshing rotor and the concaves can be changed, even while maintaining a desired average threshing clearance. Because the rotor and grates are usually not entirely concentric, one particular location between the rotor and grates will be narrower than the surrounding portions of the gap between the rotor and grates. This narrowest point is typically called the pinch point. Adjusting the pinch point location can affect the evenness of the distribution of grain falling out of the concave grates area. For example, adjusting the grate so that the pinch point is to the right or the left of the centerline of the threshing rotor can cause more material to fall on the right or left side of threshing rotor. Therefore, the lateral and substantially vertical adjustments of the grates may be used to adjust the lateral uniformity of the grain bed. Other methods for adjusting the uniformity of the grain bed are discussed throughout.

Figure 4:
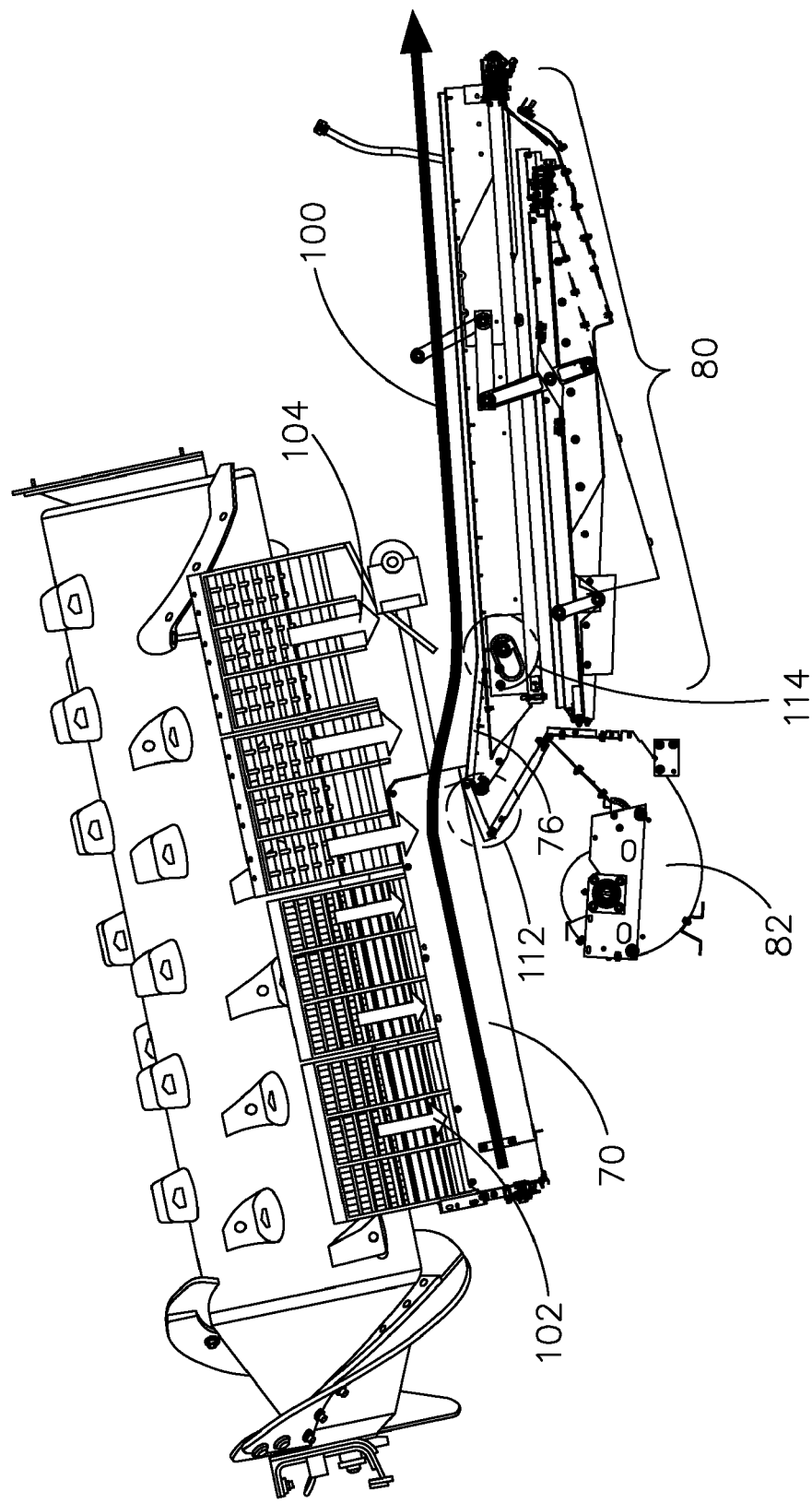
FIG. 4 is a side view of harvesting systems for use with the present invention including the flow of material.

As shown in FIG. 4, grain falling through the grates in the concave area 102 and a grate area 104, lands on a conveyor system 70 in or a grain pan 76. Grain landing on the conveyor system 70 is conveyed to the back of the combine via a conveying action. In this manner, the conveying system acts as a collection system for the threshed crop.

Because the threshed crop falls through the grates in the concave, which in some embodiments generally will span the entire width of the rotating thresher rotor, threshed crop may fall anywhere within the conveying system. Threshed crop may accumulate unevenly within the horizontal span of the conveyor system. The result of more threshed crop falling into the conveyor system on the left or the right side can be that material coming off of the conveyor system onto the cleaning system can similarly be uneven.

Figure 5:
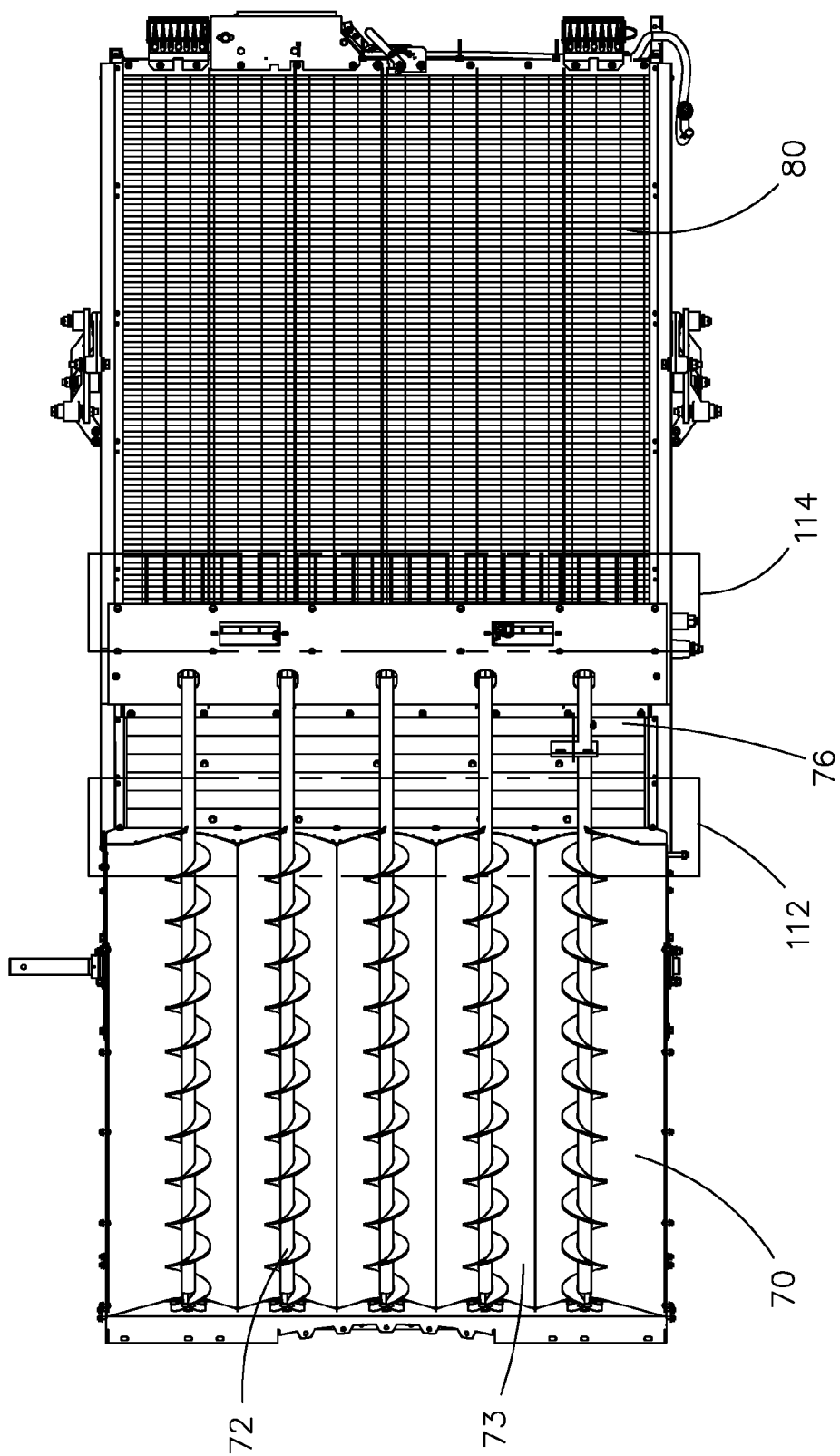
FIG. 5 is a top view of an exemplary conveyer and cleaning system for use with the present invention including exemplary sensor locations.

In some embodiments, conveying system 70 comprises a series of parallel augers 72 each in a separate trough 73 (see FIG. 5). Threshed crop falling into the conveyer system will often be unevenly distributed such that each auger trough 73 collects a different amount of threshed crop. In an exemplary embodiment shown in FIG. 5, five parallel augers 72 oriented from the front to back of the combine rotate in parallel troughs to move grain from the front to the back of combine and onto grain pan 76. In some embodiments, any number of parallel augers 72 in the conveyor system 70 can turn in the same direction. In some embodiments at least the augers at either end of the auger bed turn in opposite directions to help move grain from the walls towards the center of the auger bed 70.

In other embodiments, other conveyors known in the art can be used including a conveyor belt, a sloping surface, a fabric slide, or a reciprocating surface like grain pan 76.

Threshed crop reaching grain pan 76 is moved to the rear of the combine via a reciprocating action and gravity. In some embodiments, grain pan 76 is a corrugated or stepped sheet. In some embodiments, grain pan 76 maybe used in conjunction with an overhead return pan 84 that slopes toward the front of the combine to prevent falling threshed crop from directly impacting the grain bed in cleaning system 80. The threshed crop moving off of the conveyor system moves onto the grain bed through a space between the overhead return pan 84 and grain pan 76. These two pans serve a limited smoothing function as grain enters the grain bed to be cleaned. However the smoothing effect of the reciprocating action of return pan 76 is often insufficient to counteract unevenness created by the distribution of falling threshed crop. This uneven dispersal can reduce the overall capacity of the cleaning system.

The threshed crop follows path 100 as shown in FIG. 4. After passing grain pan 76, threshed crop is moved on to a grain bed in cleaning system 80. There, sieves reciprocate to move grain material backwards and to separate out the grain. Meanwhile the cleaning system blows air provided by fan 82 through the grain bed as it moves across the sieves to remove chaff and other lightweight particulates. Both the chaffing and sieving processes are more efficient when the grain bed depth is limited. If the distribution of threshed crop coming onto grain bed 76 is uneven, there can be portions of the grain bed are too thick for the cleaning system to operate properly.

In the prior art, if this situation occurs the operator will have to make a series of adjustments to prevent the grain from building up on one side or portion of the grain bed. The present invention provides sensors to help the operator of the combine determine if the grain bed is being dispersed unevenly and, in some embodiments, automatically make adjustments to the threshing system or the collection system to make the grain bed more even. In some embodiments, sensors for measuring the uniformity of the flow of threshed crop can be placed in the location of 112 demarcated by the dotted area, which corresponds to the boundary between the conveyor system such as an auger bed 70 and stepped grain pan 76. In other embodiments, sensors for measuring described through out the specification can be placed at location 114 also demarcated by the dotted area, which corresponds to the boundary between the stepped grain pan 76 and the cleaning system. It should be appreciated that locations 112 and 114 are at locations generally between the conveyor system and the cleaning system or approximately at this boundary.

FIG. 5 shows a vertical view of the conveyor and cleaning system. Auger bed 70 conveys threshed crop onto reciprocating grain pan 76. Threshed crop is moved from grain pan 76 on to the cleaning system 80 which comprises reciprocating sieves. Cleaning system 80 removes particulates and separates out clean grain. By placing sensors within area 112 or area 114, the system of the present invention can detect an uneven distribution between multiple lateral areas in the grain bed. At a minimum, the present invention provides to sensors in area 112 and/or area 114 such that lateral asymmetry can be detected. In some embodiments, more than two sensors are provided to gather more information about the lateral profile of threshed crop material moving onto grain bed.

Figure 6:
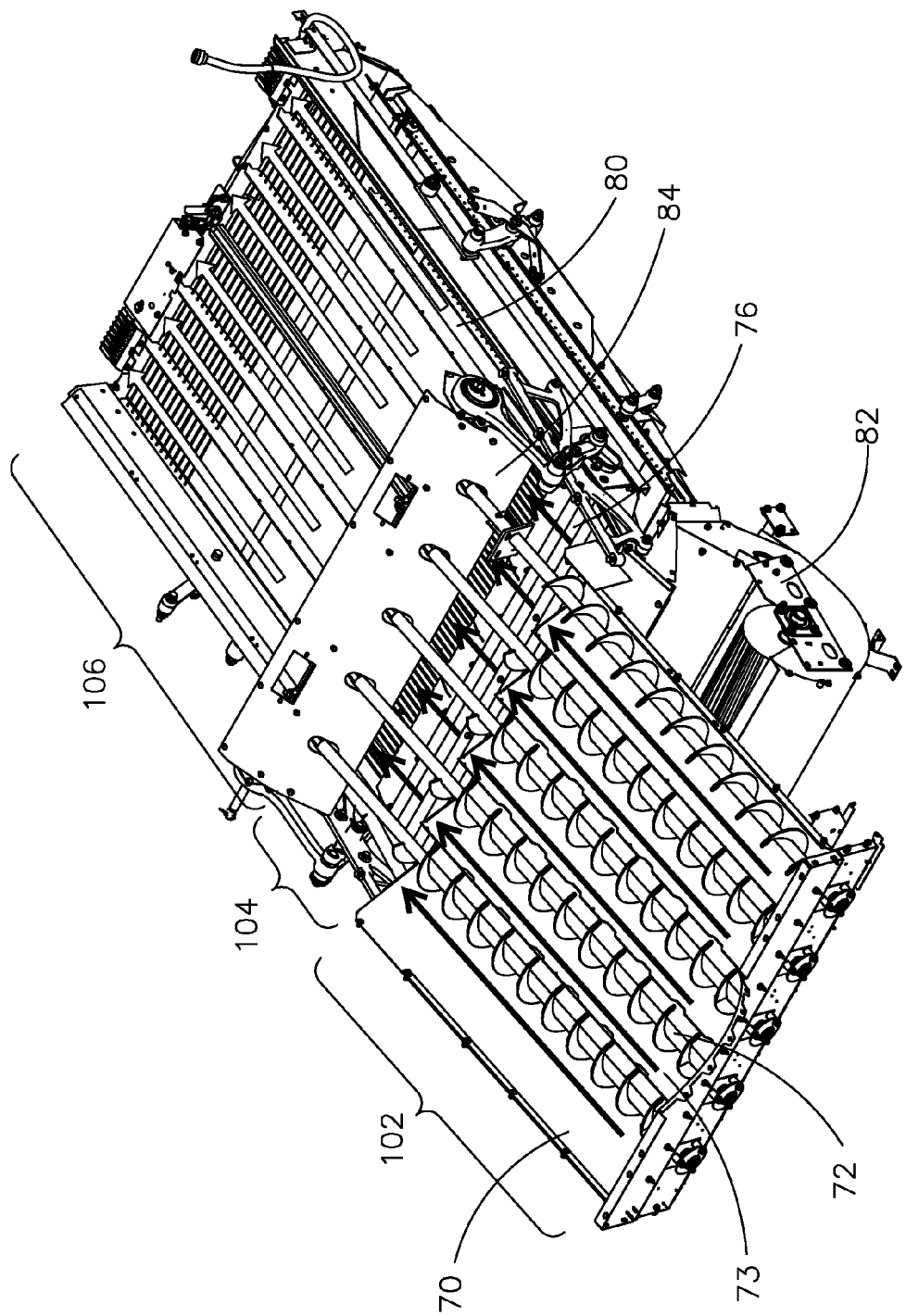
FIG. 6 is a perspective view of an exemplary conveyer and cleaning system for use with the present invention including material flow.

FIG. 6 presents a three-dimensional view of a conveyor system and cleaning system in at least one embodiment of the present invention. In FIG. 6, material flow 100 is broken into a plurality of portions of the flow indicated by arrows. Flow portions 102 show five adjacent sections through the conveyor system. In this embodiment each of the auger troughs 73 includes an individual material flow each having potentially a different amount of threshed crop. Ideally, each of the individual flows 102 is substantially equal to the other flows. However, without proper adjustment to threshing system this cannot be guaranteed. Flows 104 depict the flows coming out of the conveyor system onto the grain pan. Without some means to redirect flows 104, these flows will be substantially as uneven as flows 102. Flow section 106 reveals the portion of the grain bed moving across the sieve structure. As described throughout, it is desirable to create flows 106 that are substantially equal to one another (e.g. minimize lateral non-uniformity or make the lateral distribution substantially uniform) to optimize the efficiency of the cleaning system. The embodiments of the present invention are designed to detect unevenness in the flows shown in FIG. 6 and provide feedback to adjust the pressure system or other parameters such that flows in section 106 are substantially uniform. FIG. 6 also shows return pan 84, which can be a passive device integrated into the support structure for the auger shafts. Return pan 84 and the underlying support structure can also be used to support sensors such as feeler rod sensors when deploying in section 114.

A first sensor that maybe used with some embodiments of the present invention utilizes feeler rods connected to potentiometers to relay information to a computer control system. Feeler rod assemblies can positioned on either side of the return pan 76 to monitor the volume of material flow. More than two feeler rods sensors can also be used to gather more accurate information about the lateral distribution of grain traveling across the return pan or on the grain bed. An exemplary feeler rod sensor comprises a pivot housing to support any potentiometers monitor an angular change in rod position. The feeler rod sensor also comprises a thin gauge bar that is bent and angled such that the rod is deflected by the flow of threshed material, thereby indicating the local volume or thickness of material flow in the vicinity of the sensor. By measuring the amount of deflection of the feeler rod, the feeler rods sensor converts the relative amount (e.g. volumetric quantity) of grain causing the deflection to an electrical signal. By utilizing at least two feeler rod sensors, one on either side, the feeler rod sensors can indicate the relative amount of grain supplied to one side of the grain pan versus the other.

In some embodiments the feeler rod housing can be mounted under the return pan in the rear of the rotor cage. Exemplary embodiments a feeler rod can be formed such that the center of gravity of the rod is between the pivot bearings to make the sensor more sensitive. An exemplary feeler rods sensor for use with the present invention is described in U.S. Pat. No. 6,053,811, which is incorporated herein by reference.

An exemplary feeler rod sensor 150 is shown in FIGS. 7A (front facing view) and 7B (right facing view) and 7C (top view). Sensor housing 160 houses mechanical electrical sensing circuitry (such as a potentiometer or other electro-mechanical sensor) that detects deflection of the feeler rod 151, which is caused by threshed material flowing underneath. A feeler rod 151 is coupled to the sensor housing 160, such that the topmost portion 152 couples to circuitry that can detect rotation section 152. By coupling this location of topmost portion 152 to the mechanical-electrical sensor in housing 160, the feeler rod sensor 150 can be mounted away from the grain bed itself. Vertical support section 154 extends downward from sensor section 152 such that section 154 is substantially vertical. Section 154 allows sensor section 152 and housing 160 to be placed out of the way of flowing crop material. In some embodiments section 154 is curved within a longitudinal plane of the combine. By curving section 154 feeler rod 151 can have a center of gravity is closer to sensor housing 160, limiting the downward bias and increasing sensitivity. From section 154, the feeler rod 151 bends into horizontal detection section 156. Horizontal detection section 156 extends rearward, at a slight angle to the direction of the flow of grain, as seen in the top view of FIG. 7C. Horizontal detection section 156 effectively extends the lever arm a feeler rod 151 such that the sensor housing 160 can experience a larger amount of torque. By angling horizontal detection section 156 laterally, the horizontal detection section can detect the flow across a broader portion of the flow. As grain flows past horizontal detection section 156, horizontal detection section 156 is deflected upward such that it substantially floats on top of the flow of grain material. The amount of deflection experience by horizontal detection section 156 is sensed by mechanical electrical sensor housed in housing 160. This allows the feeler rod to measure a volumetric quantity of material flowing past feeler rod 151. In some embodiments housing 160 is mounted to the underside will return pan 84. This allows feeler rods sensor 150 to detect the level of threshed material entering the grain bed directly in the vicinity of housing 160. By utilizing multiple feeler rod sensors 150 along the width of the grain pan, feeler rod sensors 150 can provide electrical signals that indicate the relative uniformity or non-uniformity of the lateral distribution of threshed crop entering the grain pan.

A second suitable sensor for use with the present invention includes at least two load cell weight detectors. Load cells operate by determining the force placed on it, e.g. the weight of the material pressing down on to the load cell. In this manner, a load cell measures a mass quantity of local material passing the load cell. In some embodiments, Load cell sensors may be integrated into area 112 where the auger beds 70 move onto grain pan 76, including located in the auger troughs 73 themselves. In other embodiments, load cell sensors may integrate into area 114 where the return pan moves material onto the cleaning system. By measuring the relative weight between at least two load cells, the amount of lateral uniformity or non-uniformity in the distribution of flow leaving the augers can be detected.

Exemplary load cells can include capacitive devices, resistive devices, piezoelectric devices, or that any other sensor mechanism in the prior art sufficient to produce an electrical signal in response to the amount of force applied to sensor. In some embodiments, load cells may be integrated with a freely moving, substantially planar surface or multiple surfaces to allow more accurate detection of mass/weight by multiple loads sensors. In other embodiments load cells may be integrated with the return pan to determine the relative weight of one side of the return pan versus the other.

A third sensor suitable for use with the present invention is similar to the load cells described above, but rather than monitoring the entire steady-state force applied to sensor these sensors act as quantized load sensors. The quantized load sensors act to monitor changes in the dynamic load such that the sensors can count the amount of particles, such as grains, hitting the sensor during a period of time. In this way, the quantized load sensors act to count quanta of force, such as the number of grains that hit the sensor during the measurement interval. These quantized load sensors can thereby measure a local quantity of flow in the material passing the sensor. These quantized load sensors are preferably located in area 114 to measure the amount of grains that are falling on to the sieves and cleaning apparatus 80. A person having skill in the art may also choose to place quantized load sensors anywhere else in the system that may be appropriate for this purpose, including area 112. Exemplary quantized load sensors can include capacitive devices, resistive devices, piezoelectric devices, or that any other sensor mechanism in the prior art sufficient to produce an electrical signal in response to the quantity of particles impacting the sensor.

Figure 8:
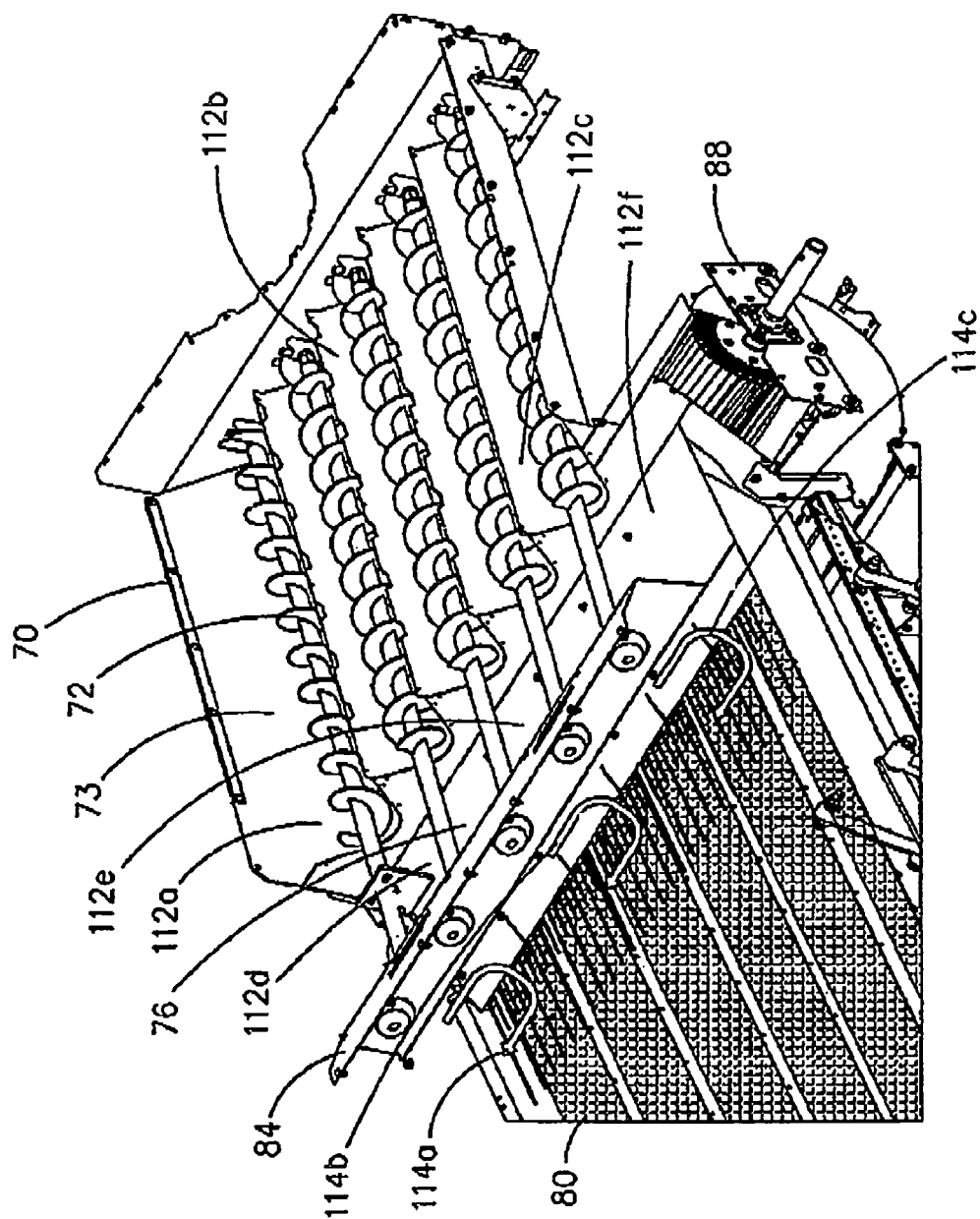
FIG. 8 is a perspective view of an exemplary conveyer and cleaning system for use with the present invention including exemplary sensor locations.

FIG. 8 depicts a perspective view of a cleaning system with sensor locations identified that may be used with embodiments of the present invention. In this example, three sensors are used for determining the uniformity in the lateral distribution of the grain bed. A first series of suggested locations for sensors in the example shown in FIG. 8 is 112 *a-c*. Locations 112*a-c* are suitable for a load sensor. By placing a load sensor in three auger troughs, the present invention can detect an approximate distribution of the mass of threshed material leaving the conveyor system. In some embodiments it will be appreciated that only two sensors are needed to determine non-uniformity in the lateral distribution. For example, the second and fourth troughs can contain loads sensors. Furthermore, it will be appreciated that a load sensor can be placed in each of the plurality of troughs shown in FIG. 8.

Sensors may be alternately, or additionally, placed at locations 112 *d-f*. Locations 112 *d*, *e*, and *f* are situated to detect material leaving the troughs onto grain pan 76. Locations 112 *d-f* are suitable for loads sensors or quantized loads sensors. In this manner, sensors placed in these locations can measure the local mass quantity of material leaving the augers or to detect the approximate local quantity of grains leaving the augers. Similarly, it will be appreciated that in this example and a number of sensors between 2 and 5 may be desirable to measure the uniformity of material leaving exemplary five auger beds.

In some embodiments, load sensors are additionally, or alternatively, place at locations 114 *a-c*. Again, the load sensors used at 114 *a-c* can be loads sensors or quantized loads sensors. By placing sensors at locations 114 *a-c*, the load sensors can directly measure the grain and other material as it enters the grain that 80. It will be appreciated that in this example any number of sensors may be desirable to measure the uniformity of material as it enters the grain bed. Some embodiments may include sensors in more than one of the above locations. Some embodiments may include sensors at various of the above locations, including any subset of the above locations. Some embodiments may include multiple types of sensors located at multiple locations.

It will be appreciated that the locations of the sensors for measuring the lateral distribution of material in many embodiments are substantially between the conveying and cleaning systems, or within these systems substantially near the boundary. Sensors can alternately be placed in any location that is deemed suitable for approximating the distribution of material in the grain bed or entering the grain bed.

Also in the example locations in FIG. 8 feeler rod sensors, such as 150, may be additionally, or alternatively, placed in the vicinity of locations 114 *a-c*. This allows the feeler rod sensors to detect the local volumetric quantity of material entering the grain bed. It will be appreciated that any number of sensors larger than one maybe used to detect the uniformity of material entering the grain bed.

Figure 9:
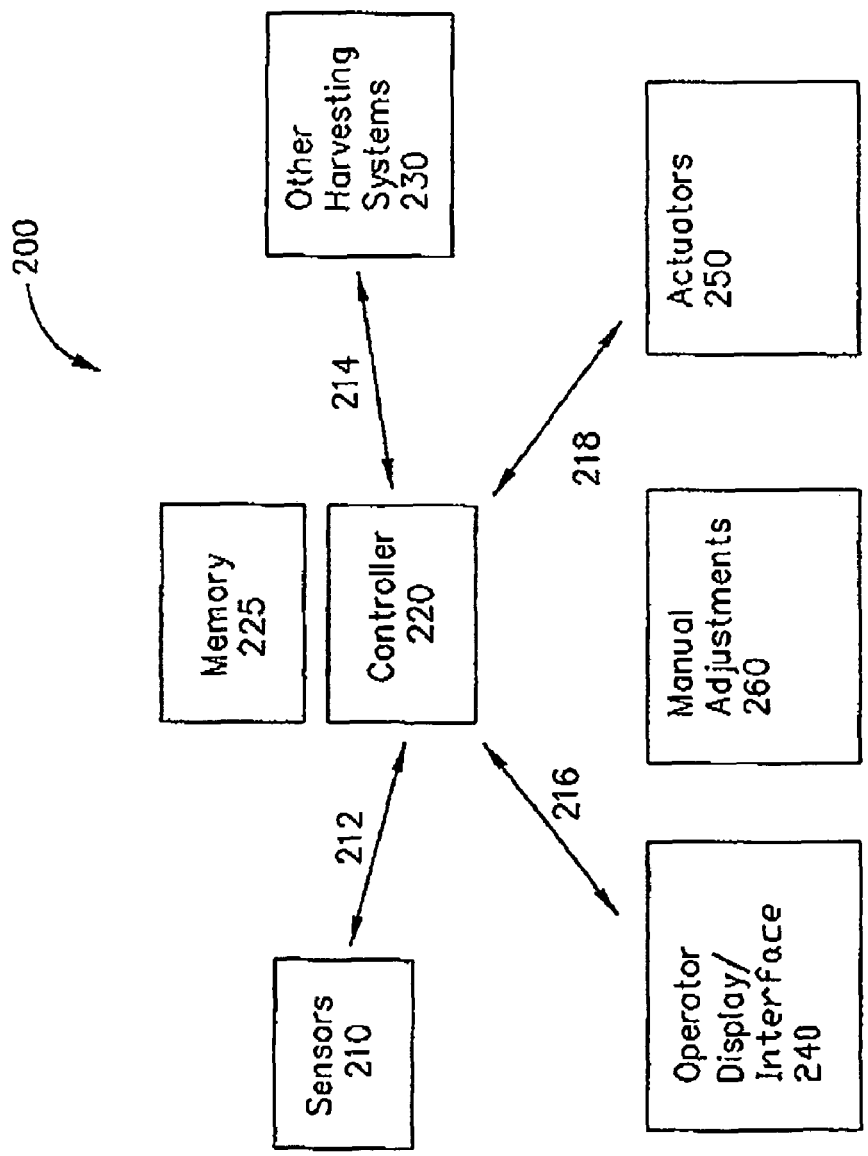
FIG. 9 is a system diagram of an embodiment of the present invention for monitoring and adjusting the flow of material in the cleaning system.

FIG. 9 is a top-level diagram of a control system 200 for adjusting parameters of the combine to ensure that the threshed crop entering the grain bed is substantially or approximately uniform. Sensors 210 are mechanical-electrical sensors, such as those described above, that are sufficient to determine an approximation of the uniformity of material entering the grain bed. Sensors 210 convey information about the uniformity/non-uniformity of the lateral distribution of the grain bed to a controller 220 via electrical signal path 212. Electrical signal path 212 can be an analog, digital or CAN bus. Controller 220 accesses programming and data information from memory 225. This data can include information about the current configuration of the combine, user profile files, and more configuration files. The instructions obtained from memory 225 may include information sufficient to make a determination regarding changes to the configuration of the combine based on sensor input received from sensors 210.

Controller 220 can receive information about the current status of the combine configuration and parameters from any number of systems onboard the combine 230 via signal path 214. These systems may be any systems available on the combine is known in the prior art. For example, information received by the controller 220 via signal path 214 may include information about the current status of the position of the concaves 20 relative to threshing rotor 12. These systems 230 may also report information such as the type of threshing mechanism being used, the type of crop, the current speed of the combine, whether combine is currently harvesting or not, or any other information that may be useful in addressing the uniformity of material in the grain bed as would be apparent to one having ordinary skill in the art.

Controller 220 may interact with operator of the combine via operator display interface 240, which is accessible to controller 220 a signaling bus 216. Signal path 216 allows the controller to receive operator input or to send messages to the operator of combine. An exemplary interaction between the controller 220 and the operator display interface 240 can include alerting the operator that an electrical or manual adjustment needs to be made to address a non-uniformity in the grain bed. Controller 220 can also seek operator permission to perform a recommended adjustment determined by controller 220. Controller 220 can further alert the operator of any manual adjustments that might be recommended. For example, if controller 220 determines that altering the angle of the rub bars for vanes (e.g. transport vanes) in the concaves is necessary, and the combine is not equipped with electrically adjustable vanes, the controller 220 may alert the operator of the need to change the configuration of rub bars or vanes in the concaves. Graphical operator interface 440 can include a screen such as a CRT, LCD, LED, OLED, AMOLED, or other appropriate screen. Graphical operator interface 440 can further include input devices such as buttons, keypads, touch screens, or the like.

In some embodiments, controller 220 may automatically make adjustments to the configuration of the combine by controlling actuators 250 via signal path 218. Exemplary actuators that may be controlled in some embodiments include actuators to control the lateral location of the pivot point of commentators relative to threshing rotor and/or the angle of commentators relative to the pivot point, or any other adjustments disclosed herein. This will allow controller 222 to automatically adjust the concaves relative to threshing rotor to change the location of the pinch point in the threshing gap. Actuators 250 may also include, in some embodiments, actuators that may adjust the orientation of vanes or rub bars in the concaves. Actuators 250 may further include in some embodiments directional deflectors, such as vanes in the flow 100 of threshed crop, that can direct threshed crop as it comes off of the auger bed 70. The directional deflectors can include actuators located under and between auger bed troughs 73. In another embodiment, actuators 250 can include actuators that adjust the horizontal level of the grain bed. These actuators may be available for access by controller 220, for example, in a combine equipped with a sidehill leveling system. It will also be appreciated the actuators 250 can also control any other mechanical system that may be sufficient for changing distribution of threshed crop entering the grain bed. Actuators 250 can include any electrically adjustable mechanical device including motors, electro mechanical devices, hydraulically or pneumatically actuated systems, or the like.

If controller 220 determines that adjustments need to be made to the configuration of the combine that are not available to be adjusted via actuators 250, controller 220 can alert the operator via interface 240 to manually adjust systems via manual adjustments 260. The option to request manual adjustment via interface 240 may allow some embodiments of the present invention to be used with older combines that lack actuators or when the amount of adjustment available via actuator is insufficient to make the lateral distribution in the grain bed substantially uniform.

In some embodiments, digital signal or analog signals or signals that comply with any desired standard can be used for signaling paths 212, 214, 216, and 218. In some embodiments, CAN signals are used to take advantage of existing CAN busses in the harvester 10. This also allows the system 200 to be integrated with other systems onboard the harvester 10 and allows simple standards-based electronic control. It should be noted that not all signaling paths 212, 214, 216, and 218 need to be bidirectional in all embodiments.

Controller 220 can be a one or more microcomputer, microcontroller, or processor including appropriate peripherals such as memory, power source, data buses, and other circuitry appropriate for carrying out its controller functionality. Controller 420 can use memory 225 to store data (e.g. saved settings, recorded status information, configuration files, user profiles, etc) or instructions (e.g. applications, algorithms, or programs used in the operation of the present invention) for use during operation of the system 200. Memory 225 is accessible to controller 220 and can be a local RAM, ROM, flash memory, hard drive, solid state storage, removable memory, or any combination or subset thereof.

Controller 220 can be a single unit that is used for multiple systems within harvester 10, besides the system 400 of the present invention. For example, controller 220 may be part of a larger electronic control circuit that may be responsible or ignition systems, driving systems, harvesting systems, entertainment systems, climate-control systems, or a number of other systems that maybe used in harvester 10.

Figure 10A:
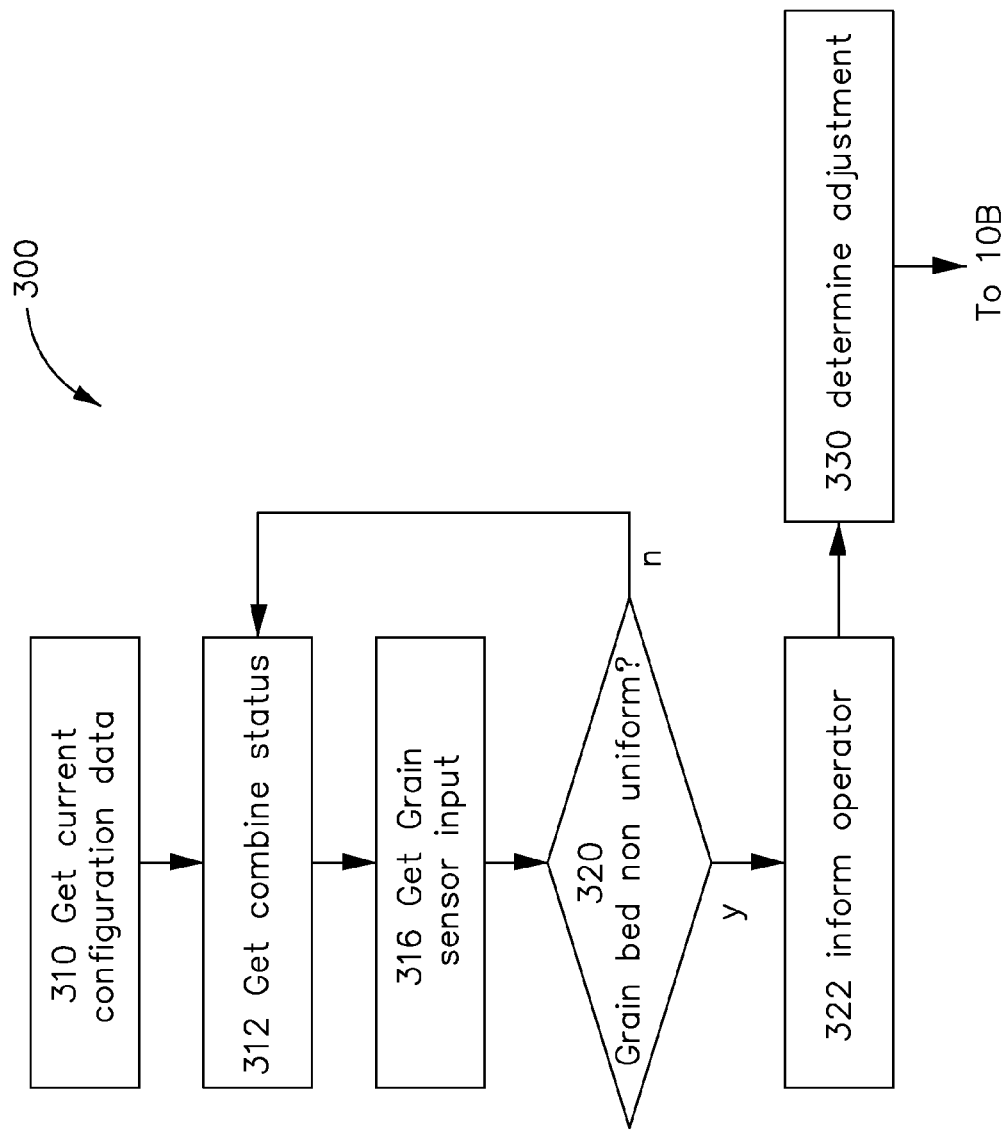
FIGS. 10A and 10B comprise an exemplary flow diagram for an embodiment of the present invention.
Figure 10B:
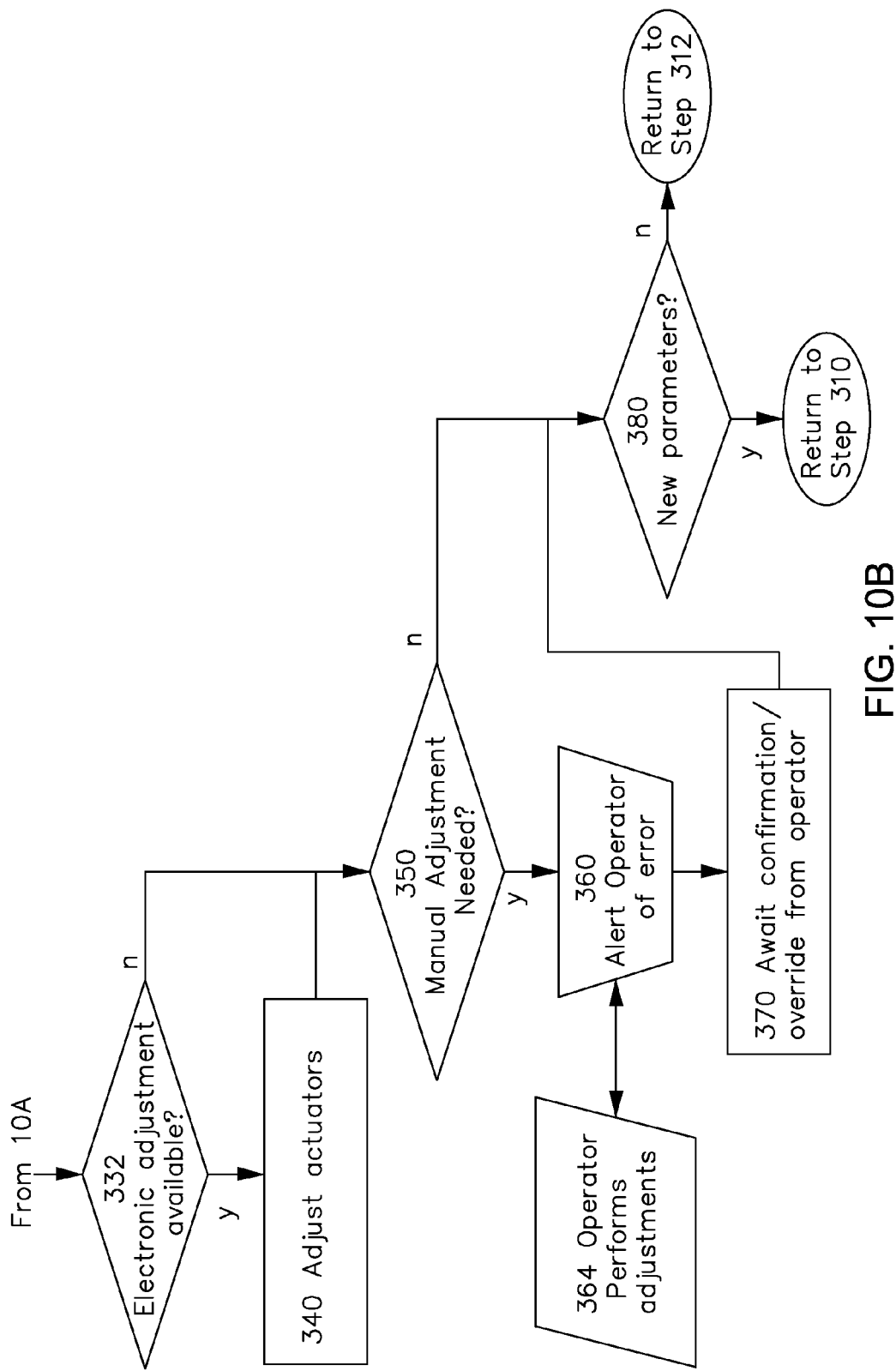

FIGS. 10A and 10B show an exemplary method 300 for use with some embodiments of the present invention. Method 300 utilizes sensor data to determine the evenness of the grain bed and can automatically make adjustments to electric actuators to reduce the unevenness in substantially real-time or can alert the operator of the problem and inform the operator what manual adjustments can be made to mitigate the non-uniformity integrated.

At step 310, system 200 gets configuration data such as by gathering configuration data is stored in memory 225. At step 310, the system may also gather configuration data by seeking user input via interface 240. For example, the operator may inform the controller 220 of the type of harvest being conducted, such as the type of crop conditions and any parameters the user may want to input. These inputs can also be stored in some embodiments into memory 225.

At step 312, controller 220 gathers information about the combine status such as through electrical signals to communicate with combine systems 230. This enables the controller 220 to gather necessary information about the current operation of the combine. For example, the combine controller 220 may gather information about the current orientation and location of the concaves relative to the threshing rotor, the current position of any directional deflectors that may be used to adjust the thickness of threshed crop entering the grain bed, the current orientation of any vanes in the concaves, or any other status information that maybe used in determining how to adjust actuators or manual configuration to optimize the uniformity of the grain bed.

At step 316, the controller 220 gathers input from the grain monitoring sensors 210. These sensors operate in accordance with any of the embodiments described throughout this specification. At step 320, the controller determines based on the sensor information received if there is any substantial non-uniformity in the lateral distribution of the grain bed. This determination can include a threshold so that adjustments may be avoided if insubstantial non-uniformity is detected in the distribution. In some embodiments, the controller 220 compares the relative values from sensors, such as by way of subtracting operation, to determine if a differential between high and low parts of the material flow exceeds a threshold. In other embodiments, the controller 220 can use a differential amplifier, such as a comparator or op amp, to determine differences between analog signals. In other embodiments the determination can include observing a time varying differential between sensors such that the controller can extrapolate expected differential and address the non-uniformity before it becomes a problem. In other embodiments controller 220 can use a proportional integral derivative (PID) algorithm or any other similar control feedback loop mechanism to supply signals to actuators such that non-uniformities are prevented before they exceed a threshold.

If at step 320 the controller 220 determines that the grain bed is uneven, the system 300 proceeds to step 322. Step 322 is an optional step in some embodiments. At step 322, the controller 220 informs the operator via a user interface 240 that there is a non-uniformity that should be corrected. In some embodiments, the system will inform the operator of the type and degree of a non-uniformity. In some embodiments, this information will give the operator a chance to override system 200 such that if a non-uniformity is minor and the operator determines that an adjustment is not critical, the method in the system 300 can be restarted, paused, or aborted.

If the system proceeds to step 330, controller 220 will determine the best course of action to adjust parameters of the combine to mitigate the non-uniformity detected. In some embodiments the result of this information is also displayed to the operator. Controller 220 can use instructions retrieved from memory 225 to make this determination. This determination may be based on any algorithm that is known in the art. Furthermore, this determination can take into account which systems are most easily adjustable via electric actuators. In some embodiments this determination can take into account operator preferences that may be stored in memory 225. In yet another embodiment, if multiple courses of action could be used to mitigate the non-uniformity, the system may display choices for adjustment to mitigate the non-uniformity to the operator via interface 240.

Referring to FIG. 10B, at step 332 the system determines if any of the available adjustments can be carried out via electronic adjustment, such as through the use of actuators 250. In some embodiments electronic adjustments are favored because they require less operator involvement and can be substantially automated without distracting the operator, and may further allow mitigation of non-uniformity of the lateral distribution in substantially real-time. Electronic adjustments to actuators 250 can also be used in embodiments where the system does not report the need for adjustment if electronic adjustment can be made without operator interaction.

At step 340, electronic adjustment is available to mitigate the non-uniformity, controller 220 will interact with actuators 250 or other electronically controlled elements to perform the electronic adjustment. In some embodiments, electronic actuators or other elements may adjust any number of: concave lateral position; concave vertical or angular position; the vane orientation within concaves; conveyor speed; fan speed; orientation of directional deflectors; or the level of the cleaning system. This step can involve a two-way exchange of information in signal path 218, such as by verifying that the adjustment has been implemented by actuators. Verification can be made via analog load sensing where analog or digital information is sent back by the actuator. In some embodiments, information about the status of the adjustment is unavailable to controller 220 but controller 220 can review the effects of the adjustment via sensors 210 in the next loop of the feedback cycle.

At step 350, the system further determines if manual adjustment to combine configuration is available and needed. For example, if the combine is unequipped with electrically controlled vanes in the threshing mechanism, but the orientation of vanes or bars in the threshing mechanism can be manually adjusted, the system controller 220 can inform of the operator of the need to perform manual adjustment via interface 240. In some embodiments, manual adjustment may be made to any number of: concave lateral position; concave vertical or angular position; the vane orientation within concaves; conveyor speed; fan speed; orientation of directional deflectors; or the level of the cleaning system.

If manual adjustment is needed at step 360, the system alerts the operator. At step 364 the operator may manually perform the adjustment. Alternatively, at step 360 the operator may decline performing the adjustment. For example, if the adjusted adjustment requested requires a shut down of the combine, the operator may choose to address the adjustment at later time.

At step 370, the system awaits confirmation or input from the operator. In some embodiments, the system can determine that the adjustment has been made automatically, such as through interaction with systems 230. Step 370 may allow the system to continue to monitor and make electronic adjustments as well.

At step 380, the system checks to see if the operator has entered a new parameters. For example if the operator determines that the system is requesting manual adjustments to the combine configuration too frequently, the operator may enter a new threshold or change user preferences to adjust how the system reacts to uneven distributions in the grain bed.

If no new parameters are entered by the user, the system may return to step 312 and again begin monitoring combine status and grain sensor inputs. If, however, new parameters are entered, the system can return to step 310 and restart the method 300, including getting new configuration data.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed:

1. A cleaning system for a combine comprising:
a conveyor system having a grain bed that moves crop material to the grain bed for cleaning;
a plurality of sensors placed between the conveyor system and the grain bed for monitoring a lateral uniformity of a distribution material entering the grain bed;
a control system for receiving electrical signals from the plurality of sensors;
wherein the control system monitors the electrical signals to monitor the lateral uniformity, wherein if the control system detects lateral non-uniformity, the control system compares the lateral non-uniformity to a threshold value and if the detected lateral non-uniformity is greater than the threshold value, then the control system communicates the lateral non-uniformity to the operator.

2. The combine of claim 1, further comprising an operator interface for displaying information about a non-uniformity in the amount material entering the grain bed.

3. The combine of claim 2, wherein the control system displays, via operator interface, recommended adjustments to correct the non-uniformity.

4. The combine of claim 3, wherein the recommended adjustments comprise one of: adjusting a concave position or adjusting an orientation of vanes in a threshing mechanism.

5. The combine of claim 1, wherein the plurality of sensors comprise a plurality of feeler rod sensors for detecting a local volume of material.

6. The combine of claim 1, wherein the plurality of sensors comprise a plurality of load sensors for detecting a local mass of material.

7. The combine of claim 1, wherein the plurality of sensors comprise a plurality of quantized load sensors for detecting a number of particles flowing in a local area.

8. A system for controlling distribution of material in a cleaning system of a combine, the cleaning system having a concave with vanes comprising:
a conveyor system that moves crop material to the cleaning system;
a plurality of sensors placed approximately at the boundary of conveyor system and the cleaning system for monitoring a lateral uniformity of, the distribution of material entering the cleaning system;
a control system for receiving electrical signals from the plurality of sensors;
one or more electrically adjustable elements coupled to the control system, the adjustment of which that can alter the distribution of material;
wherein the control system monitors the electrical signals to monitor the lateral uniformity, if a lateral non-uniformity is detected, the control system references operator defined preferences stored in memory, wherein based on the operator preferences the control system will automatically adjust at least a subset of the electrically adjustable elements to substantially maintain the lateral uniformity, and, further wherein based on operator preferences, the control system will communicate recommend adjustments to correct the lateral non-uniformity via an operator interface.

9. The system of claim 8, wherein at least a portion of the recommended adjustments require manual input from the operator.

10. The system of claim 8, wherein the plurality of sensors comprise a plurality of feeler rod sensors for detecting a local volume of material.

11. The system of claim 8, wherein the plurality of sensors comprise a plurality of load sensors for detecting a local mass of material.

12. The system of claim 8, wherein the plurality of sensors comprise a plurality of quantized load sensors for detecting a number of particles flowing in a local area.

13. The system of claim 8, wherein the control system adjusts the subset of electrically adjustable elements in substantially real time.

14. The system of claim 13, wherein the control system adjusts the subset of electrically adjustable elements such before a non-uniformity occurs.

15. The system of claim 13, further comprising a plurality of manually adjustable elements that can be manually adjusted and wherein the control system informs an operator of recommended adjustments to the manually adjustable elements.

16. The system of claim 8, wherein the control system adjusts at least one of a concave lateral position, a concave vertical or angular position, an orientation of the vane within the concave, conveyor system speed, cleaning fan speed, and the horizontal or vertical level of the cleaning system.

17. A method for controlling distribution of crop material in a cleaning system within a combine, comprising:
   causing crop material to move into a cleaning system to clean grain in the crop material;
   receiving a plurality of electrical signals from a plurality of sensors that determine a quantity of crop material entering the cleaning system;
   determining from the electrical signals the approximate uniformity in a lateral distribution of crop material entering the cleaning system;
   comparing the approximate lateral uniformity to a threshold value, wherein if the approximate lateral uniformity is greater than the threshold value, then referencing operator preferences stored in memory;
   determining at a processor based on the operator preferences if the approximate lateral uniformity should be corrected by automatically adjusting one or more configuration of the combine, or based on operator preferences, communicating the lateral non-uniform and recommend adjustments to correct the lateral non-uniformity to the operator via an operator interface;
   adjusting the one or more configuration of the combine to substantially maintain a substantially uniform lateral distribution of crop material.

18. The method of claim 17, wherein the step of adjusting comprises electrically adjusting one or more electrically adjustable elements.

19. The method of claim 18, wherein the step of adjusting one or more electrically adjustable elements occurs automatically in substantially real time.

20. The method of claim 17, wherein the step of receiving a plurality of electrical signals comprise receiving electrical signals from a plurality of feeler rod sensors that detect a local volume of material.

21. The method of claim 17, wherein the step of receiving a plurality of electrical signals comprise receiving electrical signals from a plurality of load sensors that detect a local mass of material.

22. The method of claim 17, wherein the step of receiving a plurality of electrical signals comprise receiving electrical signals from a plurality of quantized load sensors that detect a number of particles flowing in a local area.

23. The method of claim 17, wherein the adjusting step comprise adjusting at least one of: adjusting a concave position or adjusting an orientation of vanes in a threshing mechanism.

* * * * *